(12) United States Patent
Yamazaki et al.

(10) Patent No.: US 7,784,032 B2
(45) Date of Patent: Aug. 24, 2010

(54) INFORMATION PROCESSING APPARATUS

(75) Inventors: Hiroshi Yamazaki, Ome (JP); Terunobu Hara, Ome (JP); Toru Hanada, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 453 days.

(21) Appl. No.: 11/364,777

(22) Filed: Feb. 27, 2006

(65) Prior Publication Data

US 2006/0230224 A1  Oct. 12, 2006

(30) Foreign Application Priority Data

Apr. 12, 2005  (JP) .............................. 2005-114794

(51) Int. Cl.
*G06F 9/44* (2006.01)
*G06F 21/00* (2006.01)
*G06F 15/177* (2006.01)

(52) U.S. Cl. ............... 717/121; 711/6; 713/1; 713/2

(58) Field of Classification Search .................. None
See application file for complete search history.

(56) References Cited

U.S. PATENT DOCUMENTS

| 5,694,600 | A  | * | 12/1997 | Khenson et al. ............ 713/2 |
| 6,282,641 | B1 |   | 8/2001  | Christensen |
| 6,304,965 | B1 |   | 10/2001 | Rickey |
| 6,370,641 | B1 | * | 4/2002  | Maia ........................ 713/1 |
| 6,532,535 | B1 | * | 3/2003  | Maffezzoni et al. ......... 713/1 |
| 7,073,010 | B2 | * | 7/2006  | Chen et al. ................ 710/313 |

FOREIGN PATENT DOCUMENTS

| CN | 1405780     |    | 3/2003  |
| EP | 1154350     | A2 | 11/2001 |
| JP | 10-049473   |    | 2/1998  |
| JP | 2002-007139 |    | 1/2002  |
| JP | 2002-082810 |    | 3/2002  |
| JP | 2002-229922 |    | 8/2002  |
| JP | 2002-526827 |    | 8/2002  |
| JP | 2002-530739 |    | 9/2002  |
| JP | 2005-018645 |    | 1/2005  |
| JP | 2002-149408 |    | 5/2005  |

OTHER PUBLICATIONS

Office Action dated Jun. 15, 2007 in the Chinese Counterpart application together with English translation.
European Search Report dated Apr. 29, 2009 for application No. 06110024.4 (U.S. Appl. No. 11/364,777).
B. Frohlecke, O. Ehm: "Geheime BIOS-Tricks" PC-PRAXIS, Nov. 2004, pp. 16-25, XP002523213 ISSN: 0933-1476, pp. 22.
American Megatrends: "Setup for AMIBIOS8" [Online] Mar. 25, 2005, pp. 1-62, XP002523214 Retrieved for the Internet: URL:http://www.ami.com/support/doc/MAN-EZP-80.pdf> [retrieved on Apr. 8, 2009] p. 27.
Japanese Patent Application No. 2005-114794, Notice of Reasons for Rejection, mailed Jun. 1, 2010 (English translation).

* cited by examiner

*Primary Examiner*—Chuck O Kendall
(74) *Attorney, Agent, or Firm*—Blakely, Sokoloff, Taylor & Zafman LLP

(57) ABSTRACT

According to one embodiment, if a nonvolatile memory which stores format information of an HDD, a CD/DVD, an FDD and a USB storage device, and the USB storage device are connected, the drive letter of the USB storage device is virtually assigned as FDD or HDD on the basis of the format information.

20 Claims, 4 Drawing Sheets

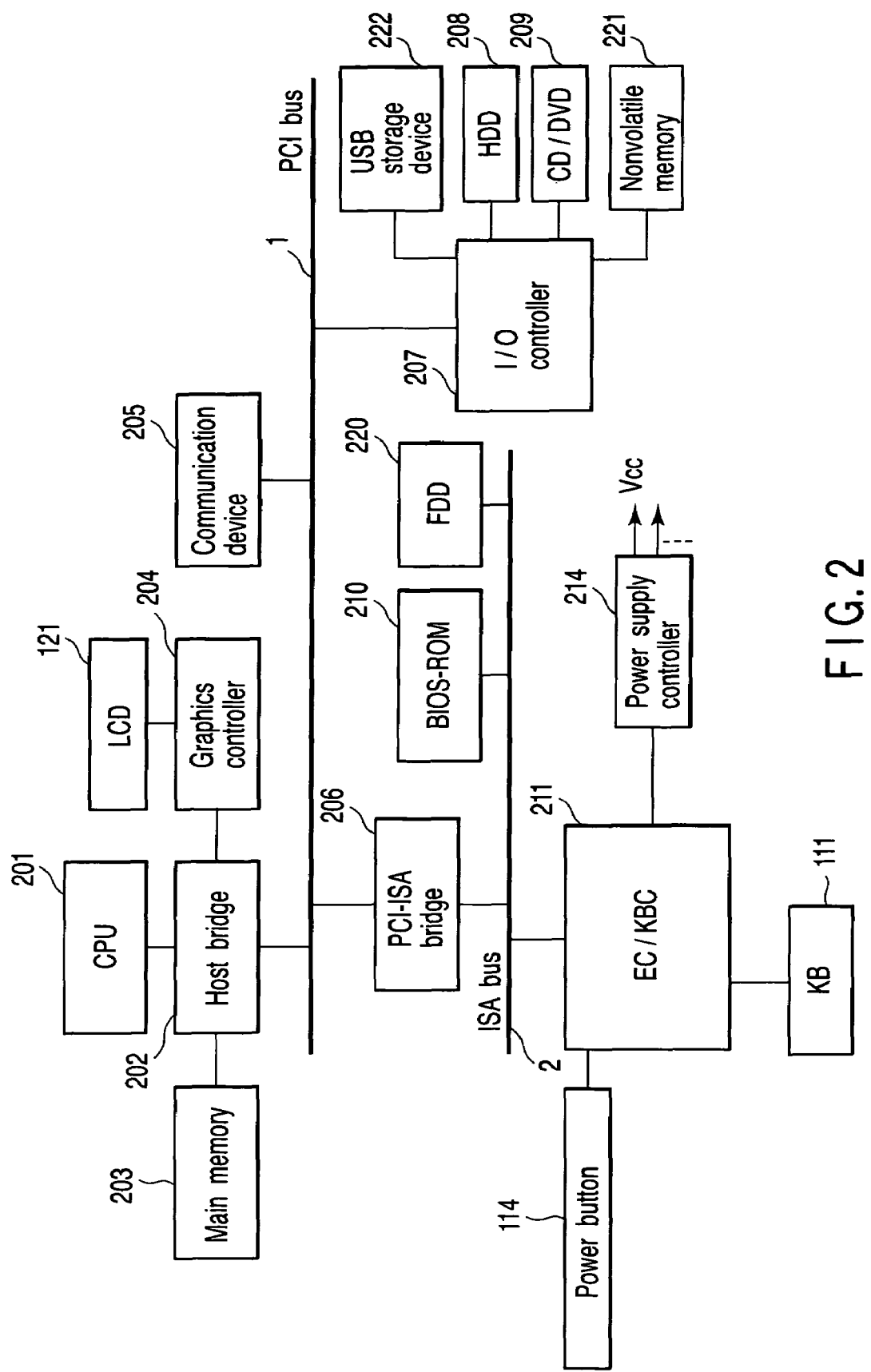
F I G. 2

```
┌──────── MEMORY ────────┐   ┌──────────── BOOT PRIORITY ────────────┐
│ Total         = 256MB  │   │ Boot Priority = HDD→FDD→CD-ROM→LAN    │
└────────────────────────┘   │ HDD Priority  = Built-in HDD →USB     │
                             └───────────────────────────────────────┘
┌────── SYSTEM DATE / TIME ──────┐                                40
│ Date (MM-DD-YYYY) = 01-01-2000 │   ┌──────────── DISPLAY ────────────┐
│ Time (HH:MM:SS)   = 00:00:00   │   │ Power On Display  = Auto-Selected│
└────────────────────────────────┘   │ LCD Display Stretch = Enabled    │
                                     └──────────────────────────────────┘
┌──────────── BATTERY ────────────┐
│ Battery Save Mode    = Full Power│  ┌──────────── OTHERS ────────────┐
│ PCI Express Link ASPM = Auto     │  │ Dynamic CPU Frequency Mode     │
└──────────────────────────────────┘  │          = Dynamically Switchable│
                                      │ Execute-Disable Bit Capability  │
┌──────── PASSWORD ────────┐          │              = Not Available    │
│ Not Registered           │          │ Auto Power On     = Disabled    │
└──────────────────────────┘          │ Diagnostic Mode   = Disabled    │
                                      │ Language During Bootup = English │
┌──────── HDD PASSWORD ────────┐      └─────────────────────────────────┘
│ HDD              = Built-in HDD │
│ HDD Password Mode = Master + User│
│ User Password    = Not Registerd │
│ Master Password  = Not Registerd │
└──────────────────────────────────┘
```

FIG. 4

SYSTEM SETUP (2/2)      ACPI BIOS version = *.***

```
┌──────── CONFIGURATION ────────┐   ┌──────────── PERIPHERAL ────────────┐
│ Device Config.  = Setup by OS │   │ Internal Pointing Device = Enabled │
└───────────────────────────────┘   └────────────────────────────────────┘
                                                                      50
┌──────────── DRIVES I/O ────────────┐  ┌──────── LEGACY EMULATION ────────┐
│ Built-in HDD                       │  │ USB KB/Mouse Legacy Emulation    │
│   = Primary IDE (1F0H/IRQ14)       │  │                     = Enabled    │
└────────────────────────────────────┘  │ USB-FDD Legacy Emulation = Enabled│
                                        │ USB Memory BIOS Support Type = HDD│
┌────────── PCI BUS ──────────┐         └──────────────────────────────────┘
│ PCI BUS   = IRQ10, IRQ11    │
└─────────────────────────────┘         ┌──────────── PCI LAN ────────────┐
                                        │ Built-in LAN   = Enabled        │
┌──────── SECURITY CONTROLLER ────────┐ └─────────────────────────────────┘
│ TPM              = Disabled         │
│ Clear TPM Owner                     │
└─────────────────────────────────────┘
```

FIG. 5

INFORMATION PROCESSING APPARATUS

CROSS-REFERENCE TO RELATED APPLICATIONS

This application is based upon and claims the benefit of priority from Japanese Patent Application No. 2005-114794, filed Apr. 12, 2005, the entire contents of which are incorporated herein by reference.

BACKGROUND

1. Field

One embodiment of the invention relates to an information processing apparatus capable of selectively assigning a drive letter to an external device as a virtual FDD or HDD.

2. Description of the Related Art

According to the prior art, a USB storage device connected to a personal computer can be set as drive A instead of FDD (see Jpn. Pat. Appln. KOKAI Publication No. 2002-229922).

It is disclosed by, for example, by limiting the drive of the USB storage device to drive A, however, the personal computer is not normally operated due to environmental conditions of software.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is a block diagram showing a system configuration of the computer connected to a USB storage device serving as external storage means according to the first embodiment;

FIG. 4 is an illustration showing a BIOS setup screen according to the first embodiment; and FIG. 5 is an illustration showing a BIOS setup screen according to the first embodiment of the invention.

DETAILED DESCRIPTION

Various embodiments according to the invention will be described hereinafter with reference to the accompanying drawings. In general, according to one embodiment of the invention, an information processing apparatus comprises internal storage means, nonvolatile storage means for storing format information of the internal storage means and external storage means, discrimination means for discriminating whether the external storage means is connected to the information processing apparatus, and assignment means for, if it is discriminated by the discrimination means that the external storage means is connected to the information processing apparatus, assigning a drive letter of the external storage means to a virtual drive, on the basis of the format information stored in the nonvolatile storage means.

Figure 1:
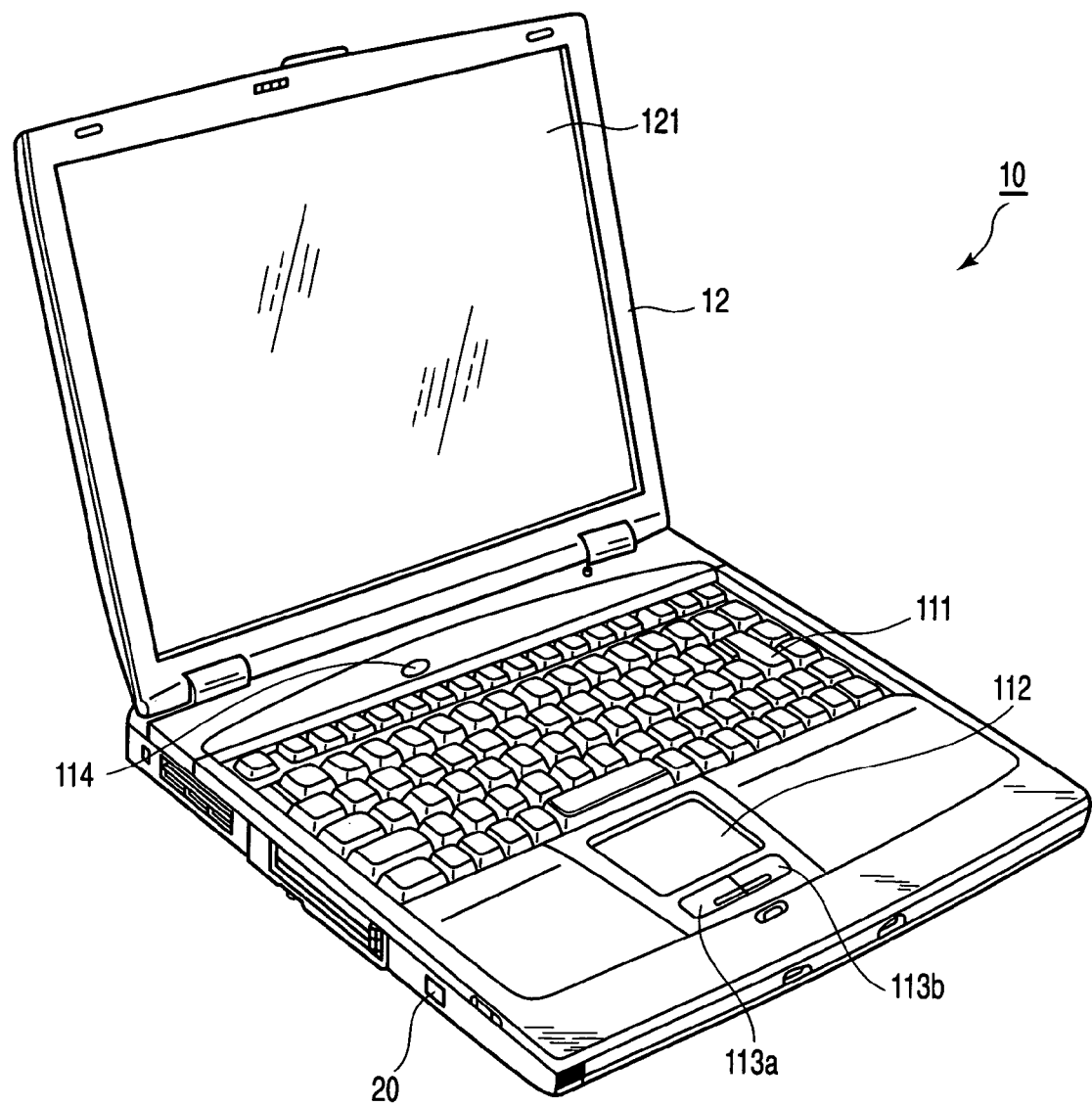
FIG. 1 is an illustration showing an outer appearance of a notebook-size computer serving as an information processing apparatus according to a first embodiment of the invention.

According to an embodiment, FIG. 1 is an illustration showing an outer appearance of a notebook-size computer serving as an information processing apparatus according to an embodiment of the present invention.

A computer 10 comprises a display unit 12. A display device composed of an LCD (Liquid Crystal Display) is embedded in the display unit 12. A display screen 121 of the LCD is arranged at a substantially central position of the display unit 12.

The display unit 12 is attached to the computer 10 to freely pivot between an opened position and a closed position. A main body of the computer 10 is a housing shaped in a thin box. A power button 114 and a keyboard 111 are arranged on a top surface of the housing. A touch pad 112 and right and left buttons 113a, 113b are arranged on a palm rest. The main body also comprises a USB terminal 20 to connect to a USB device such as a USB storage device 222 or the like serving as external storage means, on one of side surfaces.

FIG. 2 is a block diagram showing a system configuration of the computer 10 connected to the USB storage device 222 serving as the external storage means.

The computer 10 comprises a CPU 201, a host bridge 202, a main memory 203, a graphics controller 204, a communication device 205, a PCI-ISA bridge 206, an I/O controller 207, a hard disk drive (HDD) 208, a CD/DVD drive 209, a nonvolatile memory 221, a BIOS-ROM 210, an embedded controller/keyboard controller IC (EC/KBC) 211, a power supply controller 214 and the like.

The CPU 201 is a processor provided to control operations of the computer 10. The CPU 201 executes an operating system (operation system) and application programs/utility programs loaded into the main memory 203 by the hard disk drive (HDD) 208. In addition, the CPU 201 also executes the BIOS (Basic Input Output System) stored in the BIOS-ROM 210. A fingerprint sensor 21 comprises an overcurrent detecting circuit for detecting an overcurrent. The fingerprint authentication of the fingerprint sensor 21 is executed by an application for the exclusive use, etc.

The host bridge 202 is a bridge device for making a bidirectional connection between a local bus of the CPU 201 and a PCI bus 1. The graphics controller 204 controls the LCD display screen 121 employed as a display monitor of the computer 10. The communication device 205 is one of PCI devices and is employed for connection to, for example, a computer network such as the Internet. The I/O controller 207 is also one of the PCI devices. An IDE controller and the like are built in the I/O controller 207 to control the hard disk drive (HDD) 208 and the CD/DVD drive 209.

The PCI-ISA bridge 206 is a bridge device for making a bidirectional connection between the PCI bus 1 and the ISA bus 2. For example, various kinds of system devices such as a system timer, a DMA controller, an interrupt controller and the like are built in the PCI-ISA bridge 206. The BIOS is stored in the BIOS-ROM 210. The BIOS is a program for controlling the hardware components provided in the system.

The embedded controller/keyboard controller IC (EC/KBC) 211 is a one-chip microcomputer in which an embedded controller for power management and a keyboard controller for controlling the keyboard 111 are integrated. The embedded controller/keyboard controller IC (EC/KBC) 211 has a function of controlling power-on/power-off of the computer 10 in response to user's operations of a power button 114.

The nonvolatile memory 221 stores format information of the USB storage device 222 connected to the computer 10, i.e. information on whether the USB storage device 222 is formatted as a virtual FDD (assumed FD) or a virtual HDD (assumed HD). The details of the USB storage device 222 will be described later.

Next, the information processing operation according to the present invention will be described.

In the present invention, the USB storage device 222 connected to the computer 10 can be selectively handled as a virtual FDD or virtual HDD. In other words, format mode-information (hereinafter called format information) is prestored in the nonvolatile memory 221 as format information of the USB storage device 222. At the reading of the BIOS-ROM 210, the drive letter of the USB storage device 222 is assigned to the format information on the basis of the stored format.

Figure 3:
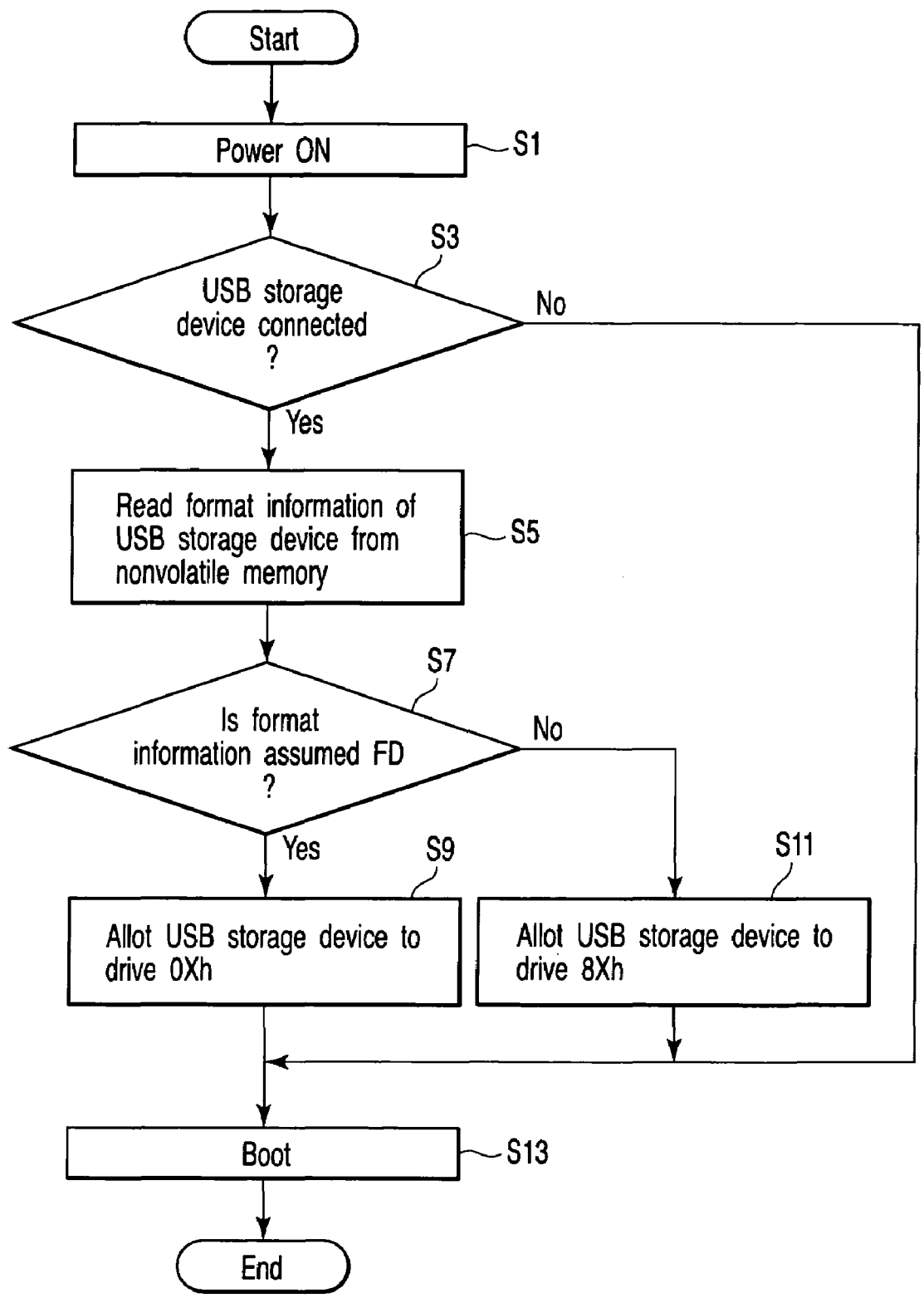
FIG. 3 is a flowchart showing assignment of the connected USB storage device according to the first embodiment.

FIG. 3 is a flowchart showing assignment of the connected USB storage device 222.

When the power button 114 is pushed down, an order of the CPU 201 is transmitted to the power supply controller 214 and the power of the computer 10 is turned on in step S1. In step S3, the CPU 201 activate the BIOS program stored in the BIOS-ROM 210 and discriminates whether or not the USB storage device 222 is connected to the computer 10. If the CPU 201 discriminates that the USB storage device 222 is not connected to the computer 10 in step S3, the CPU 201 reads the operation system stored in the FDD 220 or HDD 208 that serves as the internal storage device and executes boot (activation) in step S13.

If the CPU 201 discriminates that the USB storage device 222 is connected to the computer 10 in step S3, the CPU 201 reads the mode information (format information) of the format of the USB storage device 222 from the nonvolatile memory 221 in step S5. If the format information is the assumed FD (virtual FDD) in step S7, the CPU 201 assigns the connected USB storage device 222 to, for example, the drive of 0×h that is the drive letter of the FDD, in step S9. In other words, the CPU 201 assigns the USB storage device 222 to the drive of the assumed FD that is accessible similarly to the FDD 220.

If the format information is not the assumed FD (virtual FDD), i.e. if the format information is the assumed HD (virtual HDD), in step S7, the CPU 201 assigns the connected USB storage device 222 to, for example, the drive of 8×h that is the drive letter of the HDD, in step S11. In other words, the CPU 201 assigns the USB storage device 222 to the drive of the assumed HD that is accessible similarly to the HDD 208.

When the assignment of the drive has been ended as explained above, the CPU 201 reads the operation system stored in the FDD 220 and/or HDD 208 serving as the internal storage device, and USB storage device 222 serving as the external storage device, in step S13 to execute boot (activation).

While the power of the computer 10 is turned off, the format information is retained by setting the USB storage device 222 to be the assumed FD or assumed HD on the basis of the utility executed on the operation system and storing the setting in the nonvolatile memory 221.

FIG. 4 and FIG. 5 illustrate BIOS setup screens.

The order of priority of the boot steps, setting of the virtual drives stored in the nonvolatile memory 221, and the like can be preset on the BIOS setup screens.

In a boot priority order setting area (BOOT PRIORITY) 40, as shown in FIG. 4, the boot priority order is set to be the order of, for example, HDD, FDD, CD-ROM and LAN.

As the order of priority of HDD, for example, an order of the built-in HDD and the USB storage device 222 are set.

In a legacy emulation setting area 50, as shown in FIG. 5, validity of the USB-connected keyboard and USB-connected mouse and validity of USB-connected FDD are set. In the present invention, use of the USB storage device 222 as the virtual FDD (assumed FD) or virtual HDD (assumed HD) is newly set. For example, the USB storage device 222 is set as the virtual HDD as shown in FIG. 5.

The connected USB storage device 222 needs to be preliminarily formatted to match the format information. If the USB storage device 222 is set as the virtual HDD on the BIOS setup screen as shown in FIG. 5, the USB storage device 222 is also formatted as the virtual HDD. As the formatting method, for example, D operation system prompt is activated, a partition is created by using a command such as "fdisk", and the USB storage device 222 is formatted as the HDD with a command such as "format", on the computer 10 corresponding to the virtual drive. If the USB storage device 222 is formatted as the virtual FDD, the D operation system prompt is activated and the USB storage device 222 is formatted as the FDD with a command such as "format", on the computer 10 corresponding to the virtual drive. The formatting method is not limited to these, but formatting utility may be used.

The formatted USB storage device 222 can be used as removable media even in a case where it is connected to a general personal computer that is not applicable to the virtual drives.

In the above-described embodiment, the HDD and FDD are explained as internal storage devices. However, the other storage mediums may be used and the internal storage devices are not necessarily needed. In other words, if the computer 10 comprises the BIOS-ROM and the nonvolatile memory, the computer 10 does not need to comprise the internal storage devices, and boot may be executed by the external storage device such as the USB storage device. For this reason, the present invention can also be applied to a computer which does not comprise a built-in storage medium such as the HDD in view of security.

As a result, the USB storage device serving as the external storage device connected to the computer 10 can be assigned to the arbitrary drive letter and can be normally used in the same manner as the built-in storage device.

In addition, boot can be selectively executed by the operation system stored in the USB storage device 222 without installing another operation system in the built-in HDD of the computer 10 or replacing the built-in HDD with another HDD.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
an internal storage device;
a nonvolatile memory to store setting information that identifies one of a plurality of drive types that is to be assigned to an external storage device when the external storage device is connected to the information processing apparatus, the setting information being changeable and rewritable through a user interface; and
assignment means for assigning, upon determining that the external storage device is connected to the information processing apparatus, a drive letter of the internal storage device to the external storage device instead of assigning the drive letter to the internal storage device so that the external storage device operates as a virtual internal storage device, on the basis of the setting information stored in the nonvolatile memory.

2. The information processing apparatus according to claim 1, further comprising, an operating system stored in the external storage device is activated after the assignment means assigns the drive letter.

3. The information processing apparatus according to claim 1, wherein the plurality of drive types comprise at least a floppy disk drive (FDD) and a hard disk drive (HDD).

4. The information processing apparatus according to claim 1, wherein the setting information stored in the non-volatile memory is arbitrarily changeable and rewritable.

5. The information processing apparatus according to claim 1, wherein the internal storage device is a hard disk drive situated within a housing of the information processing apparatus.

6. The information processing apparatus according to claim 5, wherein the external storage device is a USB-connected storage medium.

7. The information processing apparatus according to claim 6, wherein the plurality of drive types comprise a floppy disk drive (FDD) and a hard disk drive (HDD).

8. The information processing apparatus according to claim 1, wherein the nonvolatile memory is a BIOS-ROM and the drive letter is assigned at reading of the BIOS-ROM.

9. The information processing apparatus according to claim 1, wherein the virtual internal storage device is any one of a USB storage device, a virtual hard disk drive, and a virtual floppy disk drive.

10. The information processing apparatus according to claim 1, further comprising a discrimination means for discriminating whether the external storage device is connected to the information processing apparatus.

11. An apparatus comprising:
an internal storage device associated with an internal storage drive letter;
a nonvolatile memory to store setting information that identifies one of a plurality of drive types that are assignable to an external storage device, the setting information being changeable and rewritable through a use interface; and
a processor to assign the internal storage drive letter to the external storage device instead of assigning the internal storage drive letter to the internal storage device so that the external storage device operates as a virtual internal storage device based on the information that identifies the one of the plurality of drive types when the external storage device is detected to be connected to the apparatus.

12. The apparatus of claim 11, wherein the external storage device stores an operating system, the operating system being activated after the processor assigns the internal storage drive letter to the external storage device.

13. The apparatus of claim 11, wherein the plurality of drive types include a floppy disk drive (FDD) and a hard disk drive (HDD).

14. The apparatus of claim 11, wherein the setting information stored in the non-volatile memory is arbitrarily changeable and rewritable.

15. The apparatus of claim 13, wherein the internal storage drive letter identifies a first letter representing the internal storage device as the FDD and a second letter representing the internal storage device as the HDD.

16. The apparatus of claim 15, wherein the external storage device is a USB-connected storage medium.

17. The information processing apparatus according to claim 11, wherein the nonvolatile memory is a BIOS-ROM and the internal storage drive letter is as signed to the external drive at reading of the BIOS-ROM.

18. The information processing apparatus according to claim 11, wherein the virtual internal storage device is any one of a USB storage device, a virtual hard disk drive, and a virtual floppy disk drive.

19. The information processing apparatus according to claim 11, further comprising an external device detector to detect whether the external storage device is connected to the apparatus.

20. A system comprising:
an external storage device; and
a computer including
a housing,
an internal hard disk drive placed within the housing, the internal hard disk drive being associated with an internal storage drive letter,
a nonvolatile memory to store setting information that identifies one of a plurality of drive types that is to be assigned to the external storage device upon coupling of the external storage device to the computer, the setting information being changeable and rewritable through a user interface, and
a processor coupled to the nonvolatile memory, the processor to assign the internal storage drive letter to the external storage device instead of assigning the internal storage drive letter to the internal hard disk based on the information stored in the nonvolatile memory so that the external storage device operates as a virtual internal storage device by now operating as the internal storage device having the internal storage drive letter.

* * * * *